United States Patent Office 3,215,612
Patented Nov. 2, 1965

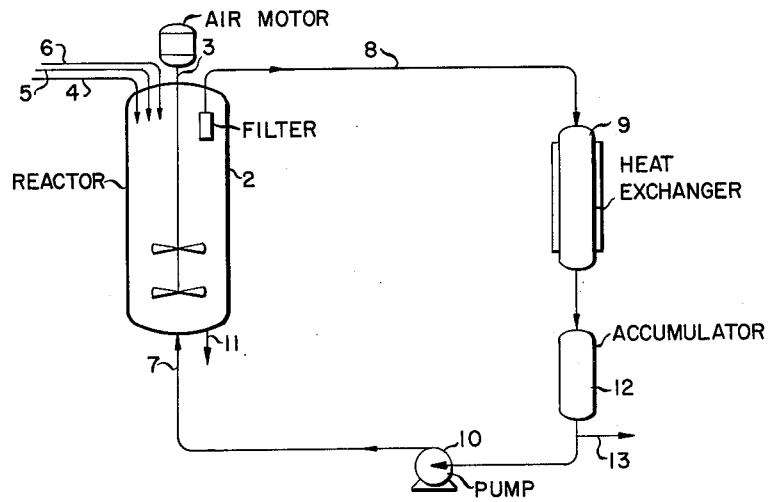
FIG. 1
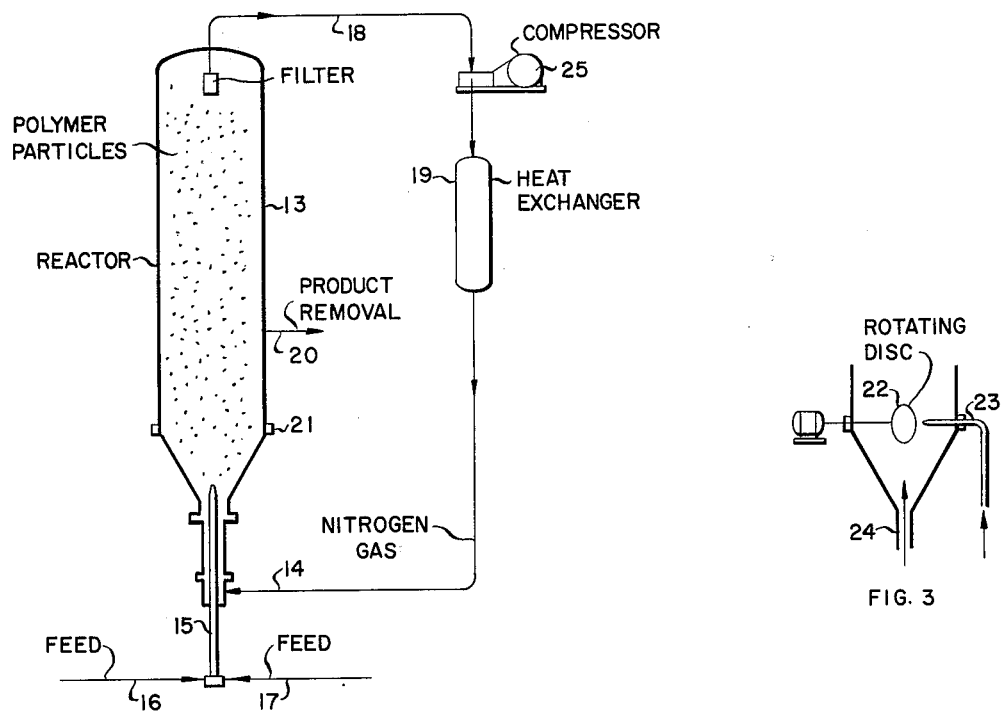
FIG. 2
FIG. 3
INVENTORS:
ALVA T. STEWART, JR.
ALAN C. NIXON
BY: *Joseph W. Brown*
THEIR AGENT

3,215,612
PROCESS FOR POLYMERIZING UNSATURATED ALDEHYDES AND RESULTING PRODUCTS
Alva T. Stewart, Jr., and Alan C. Nixon, Berkeley, Calif., assignors to Shell Oil Company, New York, N.Y., a corporation of Delaware
Filed Feb. 9, 1962, Ser. No. 172,238
20 Claims. (Cl. 204—154)

This invention relates to a new process for polymerizing unsaturated aldehydes. More particularly, the invention relates to a new process for converting unsaturated aldehydes to high molecular weight polymers that can be recovered in a form which is easily processed, and to the resulting improved high molecular weight polymers.

Specifically, the invention provides a new and highly efficient process for polymerizing at a fast rate alpha, beta-ethylenically unsaturated aldehydes, such as acrolein, to form high molecular weight water-insoluble polymers that can be recovered as finely divided particles which are dry to the touch. The new process comprises effecting polymerization of the unsaturated aldehyde in a meidum which contains solid powdered particles of a polymer of an unsaturated aldehyde, which particles are being agitated so they do not settle to the bottom of the reactor.

As a special embodiment, the invention provides a process for preparing homopolymers and copolymers of acrolein which are recoverable as palpably dry powders and are especially useful in the treatment of paper, which process comprises effecting polymerization of the acrolein or mixture of acrolein and other monomers by means of a redox catalyst system in a medium which is made up of at least 50% by weight of solid discrete particles of a polymer of acrolein, and is being maintained in a fluidized state as by rapid stirring and passing into the reaction mixture as a coolant a low boiling liquid material, said reaction being conducted at a temperature above the boiling of the coolant so as to effect vaporization of the coolant, recovering vapors of the coolant, condensing and recycling.

It is known that unstabilized acrolein changes spontaneously into a solid water-insoluble polymer known as "disacryl." This same insoluble polymer can also be obtained by heating the acrolein to high temperatures with a peroxide. While easy to prepare, these products have never acquired technical importance due chiefly to their low molecular weight.

It has recently been found that acrolein can be converted to high molecular weight polymers of considerable utility by effecting the polymerization in a water system using certain catalyst systems. Unfortunately, however, the polymers produced by these special processes are obtained as a soft, sticky, highly swollen mass which is difficult to recover and to handle during subsequent formation of polymer derivatives. In addition, such processes have a rather slow rate of reaction and a low percent conversion of monomer to polymer.

It is an object of the invention, therefore, to provide a new process for polymerizing unsaturated aldehydes, such as acrolein. It is a further object to provide a new process for converting alpha,beta-ethylenically unsaturated aldehydes to polymers having high molecular weights. It is a further object to provide a method for converting unsaturated aldehydes to high molecular weight polymers which can be recovered as a finely divided powder which is dry to the touch. It is a further object to provide a process which forms high molecular weight polymers of aldehydes which can be pulverized and are easily poured or otherwise handled. It is a further object to provide a process for converting unsaturated aldehydes to high molecular weight polymers at a fast rate. It is a further object to provide a process for polymerizing unsaturated aldehydes to form high molecular weight polymers which gives a high percent conversion of monomer to polymer. It is a further object to provide a method for preparing high molecular weight polymers of aldehydes which are used to form valuable water-soluble and solvent-soluble derivatives. It is a further object to provide a method for preparing high molecular weight polymers of unsaturated aldehydes which are particularly useful in making derivatives for treatment of paper, textiles, wood and the like.

These and other objects will be understood from the following description taken with reference to the attached drawings wherein:

FIGURE I is an illustration of a typical arrangement of apparatus for conducting the process of the invention wherein the medium is agitated by stirring, the medium is cooled by evaporation of a low boiling liquid.

FIGURE II is an illustration of a typical arrangement of apparatus for conducting the process of the invention wherein the medium is maintained in a fluidized state by use of a stream of inert gas.

FIGURE III is a diagrammatic illustration of a modified nozzle for use in the apparatus shown in FIGURE II.

It has now been discovered that these and other objects may be accomplished by the process of the invention which comprises effecting polymerization of the unsaturated aldehyde in a medium which is made up of solid powdered particles of a polymer of an unsaturated aldehyde, which particles are maintained in a highly agitated condition. It has been found that this special technique produces polymers which have high molecular weights, e.g., intrinsic viscosities of at least 0.5 dl./g. and preferably 0.6 to 0.5 dl./g. and in addition are obtained as finely divided powders which are dry to the touch and are easily pulverized and poured or otherwise handled. In addition, it has been found that this special process provides a means of forming the high molecular weight polymers at a very fast rate and with a high conversion of the aldehyde to polymer. In both features, the claimed process exceeds the conventional water sytem for polymerizing the unsaturated aldehydes.

The high molecular weight polymers formed by the process of the invention also have a high degree of potentially active aldehyde groups and can be used to form valuable water-soluble and solvent-soluble derivatives. The polymers of the present process have been found to be particularly good for use in making water-soluble derivatives for the treament of paper, textiles and the like. When applied to paper, the water-soluble derivatives of the polymers react to give paper having unexpectedly high wet strength values.

The process of the invention comprises effecting polymerization of the unsaturated aldehydes in an agitated medium which contains solid powdered particles of a polymer of an unsaturated aldehyde. The solid polymers used as the reaction medium are those obtained by polymerizing any of the hereinafter described unsaturated aldehydes. These polymers are obtained by addition polymerization through the double bond and possess a high percent of theoretical aldehyde function, e.g., an aldehyde function of over 75%. By an aldehyde function of 75%, for example, is meant that when the polymer is subjected to conventional test for the presence of aldehyde groups (e.g., addition of hydroxylamine hydrochloride and titrate liberated water with Karl Fischer reagent) the results show that over 75% of the theoretical aldehyde groups present by addition polymerization at the double bonds are present in the polymer as such or in hydrated form. The polymer may contain the aldehyde groups in hydrated form as

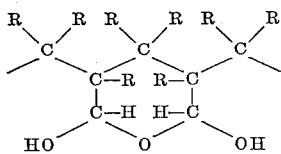

and some

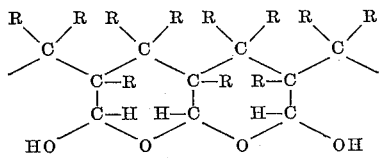

wherein R is a hydrogen or organic radical, and preferably alkyl, cycloalkyl and aryl radicals containing 1 to 10 carbon atoms.

The preformed polymers preferably have intrinsic viscosities above about 0.3 dl./g. and preferably at least 0.6 dl./g. Particularly preferred polymers are those having intrinsic viscosities between 1.0 and 3.0 dl./g. These intrinsic viscosity values are determined on the solubilized form of the polymer by the conventional technique of polyelectrolyte viscosity measurements at 25° C. On a molecular weight basis, such preferred polymers have molecular weights varying from about 50,000 to 4,000,000 as determined by the light scattering technique.

The above-described preformed polymers of the unsaturated aldehydes may be obtained by any suitable method. They may be prepared, for example, by a prior operation of the present process or they may be prepared by other techniques. Suitable other techniques are described in copending patent application Serial No. 859,156, filed December 14, 1959, now Patent No. 3,079,357 and copending patent application Serial No. 859,154, filed December 14, 1959 now Patent No. 3,167,529. So much of these disclosures of these two patent applications relative to the preparation of the aldehyde polymers is incorporated into this application by reference.

The preparation of acrolein polymers by some of the above-noted methods is illustrated below.

POLYMER A 100 parts of acrolein was added to 400 parts of water; to this mixture was added 0.271 part of potassium persulfate, 0.203 part of ferrous chloride tetrahydrate, 1 part of nonyl-phenol-ethylene oxide adducts as anticoalescent agent and 0.4 part of disodium salt of ethylene diamine tetraacetic acid. The resulting mixture was stirred for 24 hours at room temperature under atmosphere of nitrogen. During this period a white solid precipitated to the bottom. The mixture was filtered and the solid precipitate was washed with water and dried to yield 47 parts of polymer. The resulting product was a white powder polymer having an intrinsic viscosity (as determined on the sulfur dioxide solubilized form) of 1.8 dl./g.

POLYMER B 100 parts of acrolein was added to 300 parts of water and to this mixture was added 0.272 part potassium persulfate, 0.203 part of ferrous chloride tetrahydrate, and 0.4 part of disodium salt of ethylene diamine tetraacetic acid. The resulting mixture was stirred for 25 hours at 0° C. under an atmosphere of nitrogen. During that period a white solid precipitated to the bottom. The mixture was filtered and the solid precipitate was washed with water and dried to yield 27 parts of polymer. The resulting product was a white powder polymer having an intrinsic viscosity (as determined on the sulfur dioxide solubilized form) of 2.3 dl./g.

POLYMER C 1000 parts of acrolein was added to 2000 parts of water and to this mixture was added 2.73 parts of potassium persulfate, 2.02 parts ferrous chloride tetrahydrate, 10 parts of nonyl-phenol-ethylene oxide condensate and 4 parts of disodium salt of ethylene diamine tetraacetic acid. This mixture was stirred for 42 hours at room temperature (20° C.) under nitrogen. The resulting product was a white powder polymer having an intrinsic viscosity of 1.5.

POLYMER D 1000 parts of acrolein was added to 325 parts of water and to this mixture was added 2.70 parts of potassium persulfate, 2.00 parts of ferrous chloride tetrahydrate and 4 parts of disodium salt of ethylene diamine tetraacetic acid. This mixture was kept at room temperature for 6 hours with stirring and under an atmosphere of nitrogen. The resulting 46 parts product was a white powder polymer having an intrinsic viscosity of 1.02 dl./g.

The above-described polymers are present in the reaction mixture in finely divided particle form. The size of the particles are preferably smaller than 10 mesh and still more preferably between 20 and 65 mesh. The bulk density of the above-described powders preferably varies from 0.2 to 0.8. The powdered particles may contain some water but should preferably not contain more than 50% by weight of water.

The amount of the powdered polymer to be present in the reaction mixture may vary. The concentration should be such that the polymer can be retained as a powder and not as a gummy mass as in the case where the amount of water is quite large or where the molecular weight of the polymer is quite small. For powdered polymer particles of high molecular weight, the concentration of the polymer may be as low as 28% by weight of the reaction medium, and preferably between 45% and 90% by weight of the reaction mixture. Particularly superior results are obtained when the amount of the powdered polymer makes up at least 50% by weight of the reaction mixture.

The reaction medium containing the above-described polymers is to be maintained in a highly agitated condition during the process. This may be accomplished by means of rapid stirring, tumbling and the like, or by the use of a flow of inert gas, such as nitrogen, as in fluidized bed techniques. The agitation should be sufficient to keep the polymer particles from settling to the bottom of the reactor, and preferably should be sufficient to maintain the particles in a fluid state, i.e., freely suspended in atmosphere in the reactor. When using high speed stirring, rates varying from about 200 to 800 r.p.m. are generally sufficient. The use of stirring is illustrated in FIGURE I, and the use of inert gas to maintain agitation is illustrated in FIGURE II.

The amount of the unsaturated aldehyde or monomer mixture containing the aldehyde to be introduced into the reactor in relation to the above-noted polymer reaction medium may vary over a wide range. It is preferred to add as much monomer as possible and still maintain fluidized state of operation. In general, the amount of monomer may vary from about 0.1% to 30% based on the weight of the high molecular weight polymer. Preferred amounts of monomer vary from about 1% to 15% by weight of the polymer.

The catalyst system employed in polymerizing the unsaturated aldehydes may vary as desired. Preferred catalysts include the free radical yielding catalysts, such as peroxides, say at temperatures below about 30° C., redox catalyst systems and high energy ionizing radiation.

High energy ionizing radiation gives particularly good results. The kind of radiation includes high energy electrons, protons and photons. Electron beams are suitably produced by electron accelerators such as the Van de Graaff, resonance transformers, and linear accelerators or by a suitable arrangement of certain isotopes, e.g., strontium 90. High energy photons suitable for use are, for example, X-ray produced by conventional X-ray tubes and electron accelerators and gamma rays which may be produced by decay of radioactive material such as cobalt 60, cesium 137 and fission products. Although somewhat different effects may be observed in irradiation by heavy particles, the present invention also contemplates particularly the use of the high energy protons or neutrons. Proton beams are produced, for example, by accelerators such as Van de Graaff, linear accelerators and cyclotrons. Fast neutrons may be obtained within a nuclear reactor or may be obtained as a beam out of a nuclear reactor. Fast neutrons act on hydrocarbons mainly by transferring their energy to protons, which, being charged, induce ionization and excitation as they pass through the monomer mixture.

The devices suitable for producing beams of electrons, protons, X-rays, fast neutrons and slow neutrons are well known in the art and need not be described herein in detail.

Methods and apparatus for irradiating materials by means of radiation resulting from decay of radioactive substances are also well known. Sources such as rods containing a high concentration of cobalt 60 are used in various arrangements for the iradiation of materials as described, for example, in the paper by Burton et al., Nucleonics 13 (No. 10–74 (1955)) and references cited therein.

The total dosage employed in the polymerization may vary over a wide range, depending on the particular monomer utilized. Preferred total dosage varies from about $10^5$ to $5 \times 10^6$ rads. The dosage rate will also vary considerably. Preferred dosage rates vary from about $10^4$ to $10^{12}$ rads per hour, and still more preferably $10^5$ to $10^{10}$ rads per hour.

Particularly outstanding results are obtained by using a redox catalyst system. This system includes a free radical yielding catalyst and a reducing agent.

Examples of free radical yielding catalysts that may be employed include, among others, peroxides, such as benzoyl peroxide, hydrogen peroxide, potassium persulfate, potassium permanganate, methyl cyclohexyl peroxide, alkali perborates, diacetyl peroxide, tertiary butyl hydroperoxide, tertiary amyl hydroperoxide, ditertiary butyl peroxide, ditertiary hexyl peroxide, acetyl benzoyl peroxide, cumene hydroperoxide, tetralin hydroperoxide, phenylcyclohexane hydroperoxide, tertiary butyl isopropylbenzene hydroperoxide, tertiary butyl peracetate, tertiary butyl perbenzoate, ditertiary butyl perphthalate, ditertiary butyl peradipate, tertiary butyl percarbonate, and the like. Particularly preferred free radical yielding catalysts include the peroxides, such as the dialkyl peroxides, diaryl peroxides, tertiary alkyl hydroperoxides, alkyl peresters of percarboxylic acids, and particularly those of the above-noted groups which contain no more than 18 carbon atoms each.

The above described free radical catalysts are employed in small amounts, the exact amount being dependent upon the particular type selected and the molecular weight of the polymer desired. In general, the amount of catalyst used will vary from about $1 \times 10^{-5}$ to about $2 \times 10^{-2}$ mols per mol of unsaturated aldehyde being polymerized. Preferred amounts vary from about $1 \times 10^{-2}$ to $1 \times 10^{-4}$ mols per mol of aldehyde being polymerized.

Any of the known reducing agents may be employed with the above-described free radical yielding catalysts. This includes, among others, polyamines such as triethylene diamine, and tertiary amines such as dimethyl aniline, adducts of sulfur dioxide and aldehydes and ketones, dithionite, thiosulfates, bisulfites, aqueous sulfur dioxide solutions, adducts of sulfur dioxide and polymeric aldehydes, such as those prepared by the present process, and various multivalent metals, i.e., those metals which can change their valence state reversibly, such as, for example, iron, manganese, copper, vanadium, cobalt, nickel, tin, silver, titanium, etc. When added to the reaction mixture, the metal must be at least in a lower valence state, such as, for example, ferrous chloride, silver nitrate, titanium dichloride, cobaltous chloride, ferrous pyrophosphate, potassium ferrocyanide, mangaous sulfate, ferrous sulfate, and the like. The anion portion of the metal salt may be of any type as long as the resulting salt has the necessary solubility in the reaction medium.

Coming under special consideration as reducing agents are the sulfur dioxide adducts of the aldehyde polymers. These aldehyde polymers used in the preparation of the adducts may be any type of aldehyde polymer but are preferably those of the type described for use as the preformed polymer. The adducts are preferably obtained by suspending the aldehyde polymer in an aqueous solution containing sulfur dioxide. The amount of the polymer added will vary depending on the particular agent involved and the concentration of the agent. In general, it is preferred to add from 1 to 50 parts of the polymer per 100 parts of water. The concentration of the solubilizing agent, e.g., the sulfur dioxide, will generally vary from 1% to 25%. Superatmospheric pressures may be utilized to maintain high concentrations of $SO_2$ in solution. Stirring and heating may be applied in the dissolution. Temperatures employed will generally vary from 20 to 30° C. to 90° C. Various other means such as addition of small amounts of acid catalyst or the addition of swelling agents as acetone may also be employed to assist in the dissolution.

The $SO_2$ adducts will have substantially the same molecular weight as the basic polymer. The adduct will contain a plurality of free sulfonate groups contained in the molecule and the products may therefore be regarded as high molecular polymeric polysulfonic acids. For example, the polymer may contain units, such as

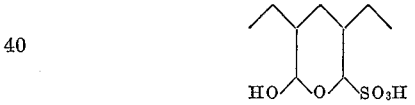

The formation of the adduct according to the above-described process is illustrated by the following preparation of an adduct of the above-described Polymer A.

SOLUBILIZED POLYMER A 10 parts of the above-described Polymer A was added to a 10% parts by weight aqueous $SO_2$ solution and the mixture heated to 50° C. After a few minutes the polymer dissolved to form a clear solution. Evaporation of the water at low temperature produced a white powder identified as a sulfur dioxide adduct of polyacrolein having an intrinsic viscosity of about 1.8 dl./g.

The preferred adducts to be used in the process of the invention comprise the sulfur dioxide adducts of polyacrolein having an intrinsic viscosity between 0.3 and 3.0 dl./g.

The amount of the reducing agent employed will depend upon the amount of the peroxide catalyst utilized. It is preferred to have at least an equivalent amount of the reducing agent per equivalent amount of peroxide catalyst. With reference to the sulfur dioxide-containing reducing agents, an equivalent amount refers to that amount needed to release one mol of sulfur dioxide per mol of the peroxide catalyst. As for the metals, it is preferred to have at least one gram ion of the metal per mol of the peroxide catalyst, and more preferably 0.5 to 1 gram ion per mol of peroxide.

In operating the process of the invention, the preformed solid particles of the aldehyde polymer are placed in the reaction chamber and agitation applied. The monomer and catalyst (if added) are then introduced into the reactor in any order. Such addition may be separately or in admixture and may be all at the beginning of the reaction or intermittently or continuously over a period of time. It is generally preferred to operate the process in a continuous manner as noted hereinafter wherein the monomer, catalyst and reducing agent are introduced continuously and a portion of the reaction mixture containing polymer is withdrawn continuously.

In case of radiation, the polymer is placed in the reactor, the monomer added to the mixture exposed to radiation as noted above.

The temperature employed in the process may vary over a considerable range, depending on the catalyst employed. With radiation, temperatures employed may vary from say —100° C. to +100° C. With peroxides and with redox systems, it is generally preferred to employ relatively low temperatures, e.g., temperatures below about 50° C. In general, temperatures will vary from freezing point of the reaction mixture to about 45° C. Particularly preferred temperatures range from 0° C. to 40° C. As the reaction is exothermic, some cooling means preferably should be employed to keep the reaction within the above-described ranges.

Suitable methods include insertion of heat exchange surface (e.g., cooling coils) inside the reactor, or circulation of the fluidized particles through external heat exchanges.

A preferred method of cooling comprises introducing a low boiling material, e.g., one having a boiling point below that of the unsaturated aldehyde being polymerized, such as, for example, isopentane, pentane, isohexane and the like, at the bottom of the reactor and when it vaporizes due to the heat of reaction to remove the vapors at the top, cool and condense and recycle the coolant back to the reaction zone. This method of operation is illustrated in the attached drawing and in the working examples at the end of the specification.

Atmospheric, superatmospheric or subatmospheric pressures may be utilized as desired. In some cases, it is desirable to operate at reduced pressures so as to permit vaporization of the monomer and thus aid in the cooling of the reaction mixture.

It is also preferred in some cases to maintain an inert atmosphere during the polymerization. This may be accomplished by passing inert gas, such as nitrogen, and the like into the reaction zone. In case of the fluidized bed technique, the inert gas may be used as the means for maintaining the polymer in the fluidized state. The passage of the inert gas through the reaction mixture can also be used to cool the mixture. In this case, the gas is passed through a heat exchanger before being recycled.

To more clearly illustrate how the process of the invention may be accomplished, FIGURE I has been attached to show more or less diagrammatically a typical arrangement of apparatus that may be used for a preferred embodiment of the process of the invention wherein the agitation is maintained by stirring and the medium is cooled by evaporation of a low boiling liquid.

In the operation of the apparatus as shown in FIGURE I, the finely divided polymer particles are placed in reactor 2, and the particles kept suspended in gas by use of the rapid stirrer 3. The unsaturated monomer is then introduced through line 4, the peroxide catalyst through line 5, and the reducing agent through line 6. A low boiling inert liquid, such as isopentane, is introduced at the bottom of the reactor through line 7, the vapors of the low boiling liquid are collected at the top through line 8, cooled at heat exchanger 9, collected at accumulator 12, and recycled by means of pump 10. A portion of the isopentane is bled through line 13 to reject impurities. A portion of the reaction medium containing the formed polymer can be removed through line 11 when operating on a continuous basis.

FIGURE II illustrates more or less diagrammatically a typical arrangement of apparatus that may be used for another preferred embodiment of the process of the invention wherein the polymer particles are kept in suspension by means of a stream of inert gas, such as nitrogen.

In the operation of the apparatus as shown in FIGURE II, the finely divided polymer particles are placed in reactor 13, and the particles kept suspended in the atmosphere in the reactor by a stream of nitrogen gas being introduced at the bottom through line 14. The monomer plus part of the catalyst system is introduced at line 16 and mixed with the rest of the catalyst system from line 17 and introduced to the reactor through line 15. The inert gas is withdrawn through line 18, compressed at compressor 25, cooled at heat exchanger 19, and then recycled at line 14. Polymer can be withdrawn at line 20.

FIGURE III is a diagram of a special nozzle arrangement that may be introduced at 21. The use of a nozzle such as this is desirable in the event there is a tendency for the ingredient to clog the apparatus at the nozzle. In this case, a rotating disc 22 is placed at the side of the bottom entry, the mixture of monomer, catalyst and reducing agent is introduced at line 23 so that the mixture impinges on the rotating disc and is through up into the reactor. The inert gas is introduced at line 24 below the disc so that the gas assists in carrying the ingredients up into the reactor without danger of clogging.

The polymer formed by the polymerization will be maintained in a stage of agitation by the above-described step of stirring or flow of gas. When the reaction is stopped, the polymer will precipitate to the bottom of the reactor as insoluble particles. The polymer can then be recovered, washed, filtered and utilized in the intended application.

The polymers prepared by the claimed process are solid substantially white high molecular weight products. They have intrinsic viscosities (as determined on the solubilized form) of preferably at least 0.5 dl./g. and still more preferably from 0.6 to 6.0 dl./g. These values are determined by the conventional technique of polyelectrolyte viscosities as noted above.

The polymers are also recovered as finely divided dry-to-the-touch pulverizable particles. They will be dry to the touch and contain less than about 50% water. In this regard, they are distinguished from the products prepared by the conventional water technique for polymerizing the monomers as in that case the resulting product contains 70–80% water and are soft sticky masses.

The polymers are also characterized by the fact that they possess a high theoretical aldehyde function, e.g., over 75%. The aldehyde groups may be free or in hydrated form. The polymer may contain the aldehyde groups in hydrated form as

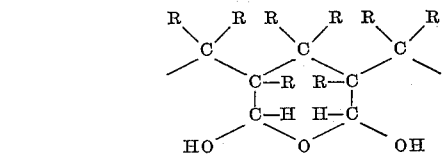

and some

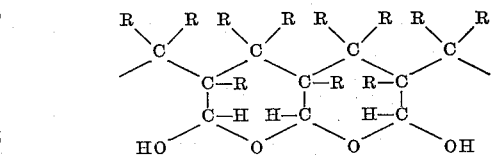

wherein R is hydrogen or hydrocarbon and particularly alkyl, cycloalkyl and aryl radicals containing 1 to 10 carbon atoms. This clearly distinguishes the polymers of the invention from those produced by conventional methods wherein the polymer possesses at most only 60–75% of the theoretical aldehyde function.

The polymers are also characterized by being insoluble in water and insoluble in conventional solvents, such as benzene, toluene, acetone and the like.

Materials such as acetone tend to swell the polymer, but do not dissolve the material. The polymers may be dissolved by reaction materials as alcohols, mercaptans and the like.

While the above-described polymers may be utilized as such by molding at high temperatures to form plastic articles, they have been found to be of greatest use in the solubilized form.

The water-soluble derivatives of the new high molecular weight polymers may be obtained by a variety of methods. They are preferably prepared by suspending the high molecular weight polymer in an aqueous solution containing the water-solubilizing agent, such as, for example, sulfur dioxide or an alkali bisulfite, such as sodium bisulfite. The amount of the polymer added will vary depending on the particular agent involved and the concentration of the agent. In general, it is preferred to add from 1 to 50 parts of the polymer per 100 parts of the water. The concentration of the solubilizing agent will generally vary from about 1% to 25%. Stirring and heating may be applied to assist in the dissolution. Temperatures employed will generally vary from about 20° C. to about 90° C. Various other means, such as addition of small amounts of acid catalyst or the addition of swelling agents as acetone, tetrahydroforan may also be employed to assist in the dissolution.

The water-soluble derivatives will have substantially the same molecular weight as the water-insoluble basic polymer. In the case of the sulfur dioxide and bisulfite, the polymer will also contain a plurality of free sulfonic groups or water-soluble salt sulfonate groups contained in the polymer molecule and therefore may be regarded as polymeric polysulfonic acids and polymeric polysulfonate metal salts. For example, the polymeric sulfonic acids will contain

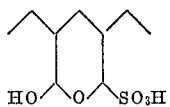

groups. (The backbone of the polymer is as described above.)

The water-solubilized polymers may be used for a great many applications. As water solutions, they may be used in the formation of films, threads, treatment of animal skins, and the like, and as coatings for various materials as wood, metal and the like.

The polymers solubilized with alkali bisulfites and aqueous sulfur dioxide have been found to be particularly useful as wet strength agents for papr. In this application, the polymers may be applied during the beater stage or as an after-treatment for the paper. Preferably the aqueous solution of the polymer is added during the beater stage when the suspension of paper pulp is being rapidly agitated. This addition may be at the beginning of the beater operation or intermittently or at the end of the operation. If the aqueous solution is applied to the finished paper, it may be added by spraying, or by rollers or by dipping or running the paper through a conventional size press, size tub or at the calenders.

After the aqueous solution has been applied to the paper as indicated above, the treated product is subsequently dried to effect cure. The drying may be accomplished by merely rolling or squeezing off the excess solution and then setting out in the air to dry or by using forced air. Temperatures used in the drying may vary from about room temperature, e.g., about 20° C. to 100° C. or more. The period of drying will depend largely on the amount of pick-up and concentration of the polymer solution. In most instances, drying periods of from about 1 to 30 minutes should be sufficient.

Any type of paper may be treated according to the process of the invention. Examples of such paper include, for example, those prepared from wood, cotton, linen, hemp, jute, mulberry, straw, bamboo, cane and agone fibers or mixtures thereof, by any of the known processes such as the sulfate process, soda process and sulfite process. The paper may be colored or white and may be further treated for special applications.

The paper treated according to the above may be used for a variety of applications, such as facial tissue, hand towels, maps, filing cards, construction paper, wrapping paper, containers and the like. Because of its resistance to hydrolysis and relative non-toxic nature, the paper is particularly suited for use in preparing wrapper or containers for food.

The solvent-soluble derivatives of the above-described new high molecular weight polymers may be prepared by a variety of methods. They may be prepared, for example, by adding the solid polymer particles to a liquid medium containing a swelling agent, such as benzene, phenol and the like, an acid catalyst, such as p-toluenesulfonic acid, and a reactive diluent, such as an aliphatic or cycloaliphatic alcohol, such as methanol, ethanol, ethylene glycol, hexylene glycol, 1,5-pentanediol and the like. The amount of polymer added will generally vary from about 1 to 50 parts of polymer per 100 parts of solvent and swelling agent. The amount of catalyst employed will generally vary from about 0.1% to 5% by weight of the total solution. The amount of the swelling agent will vary from about 2 to 200 parts per 100 parts of the polymer. The amount of the reactive diluent employed will depend upon the degree of solubility and molecular structure change desired. If, for example, it is desired to convert all of the theoretical aldehyde groups to acetal groups, an excess over the theoretical amount of diluent needed to effect this change should be employed. In most cases, the amount of diluent employed will vary from about 10 parts to 1000 parts per 100 parts of the polymer.

Stirring and heating may be employed to assist in the formation of the solvent-soluble derivatives. In most cases, temperatures varying from about 20° C. up to and including reflux temperature of the solution may be employed.

The solvent-soluble polymer derivative may be recovered by any suitable means, such as precipitation, extraction, distillation and the like.

The solvent-soluble derivatives are in most cases substantially white to light-colored solids having substantially the same molecular white as the basic insoluble polymer. The acetal derivatives, for examples, will contain units as

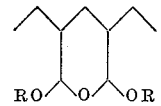

(the backbone of the polymer is as described above) wherein R is derived from the alcohol by removing an OH group, such as hydrocarbon radicals as alkyl, cycloalkyl radicals.

The alpha,beta-ethylenically unsaturated aldehydes used in the process of the invention comprise those monoaldehydes having an ethylenic group in the alpha,beta-position relative to the aldehyde group, such as, for example, acrolein, and alpha- and beta-substituted acroleins, as methacrolein, alpha-ethylacrolein, alpha-butylacrolein, alpha-chloroacrolein, beta-phenylacrolein, alpha-decylacrolein, alpha-cyclohexylacrolein, and the like. Preferred aldehydes to be employed in making the polymers include the alpha,beta-monoethylenically unsaturated monoaldehydes containing from 3 to 12 carbon atoms, and especially acrolein and the alpha- and beta-substituted acroleins where the substituent on the alpha and/or beta positions is an alkyl, cycloalkyl or aryl group containing no more than 8 carbon atoms. 2-alkenals containing up to 8 carbon atoms come under special consideration.

The process of the invention may also be used to copolymerize the above-noted unsaturated aldehydes with another aldehyde or with another compound containing an ethylenic group, such as, for example, acrylonitrile, methacrylonitrile, crotonaldehyde, methyl acrylate, ethyl acrylate, acrylic acid, methacrylic acid, methyl methacrylate, butyl acrylate, vinyl acetate, dibutyl maleate, diethyl maleate, allyl acetate, allyl butyrate, allyl benzoate, vinyl benzoate, vinyl chloride, vinylidene chloride, styrene, butadiene, methylpentadiene, alpha-methylstyrene, vinylpyridine, N-vinylpyrolidone, acrylamide, N-methyl acrylamide, isoprene, 1,4-octadiene, diallyl phthalate, divinyl phthalate, divinyl adipate, ethylene, propylene, isobutylene, and the like, and mixtures thereof. Particularly preferred monomers to be employed include the alpha,beta-ethylenically unsaturated nitriles, the alkyl esters of acrylic and alpha-substituted acrylic acids, vinyl esters of monocarboxylic acids, allyl esters of monocarboxylic acids, olefins, diolefins, unsaturated esters of polycarboxylic acids, and nitrogen-contaning monomers as the amides of unsaturated carboxylic acids, all members of the foregoing preferably containing no more than 12 carbon atoms each.

The amount of the above-described unsaturated monomers to be employed with the unsaturated aldehydes in making the copolymers may vary over a wide range. In general, the amount of the dissimilar monomer may vary from about 0.1% to as high as 80 to 90% of the combined mixture. Preferred amounts of dissimilar monomer vary from about 1% to 50% by weight of the combined mixture.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts are parts by weight.

*Example I*

The preformed polymer used in this experiment was a finely divided homopolymer of acrolein having an intrinsic viscosity of about 1.74 dl./g., a mesh size between 20 and 65 and bulk density of about 0.3 gr. per cc. The polymer was obtained by polymerizing acrolein in a water system using a redox catalyst and then vacuum stripped and dried. The polymer contained about 50% by weight of water.

The apparatus used in the experiment was arranged similar to that shown in FIGURE I with the reactor having a volume of 1.5 liters.

375 grams of the above preformed polymer was charged to the reactor and the powdered polyacrolein stirred at a rate of about 300–500 r.p.m. To the reactor was continuously added acrolein, sulfur dioxide and tertiary butyl hydroperoxide. The acrolein was pumped at approximately 90 ml. per hour. The acrolein feed contained 0.35% by weight of tertiary butyl hydroperoxide (2 millimoles of peroxide per mole of acrolein). The sulfur dioxide was pumped as a 1.93% by weight solution in water at approximately 9 ml. per hour (2 millimoles per mole of acrolein).

Liquid isopentane was pumped to the reactor at a rate sufficient to maintain the polymerization reactor at 35–40° C. with the vaporization of the isopentane utilizing the heat liberated by polymerization of the acrolein. The isopentane vapors (which also contained some acrolein) were condensed in an external heat exchange and recirculated to the reactor as cooling requirements dictated.

The operation was continued for four hours and 10 minutes, at the end of which time the reactor was opened and polyacrolein removed. 557 parts of polymer which contained 37% by weight of water was recovered. The net make of polymer on a dry basis was 163 grams. The recovered polymer had an intrinsic viscosity of about 1.62 dl./g. 350 milliliters of acrolein were fed during the run. This amounts to 292 grams of crude acrolein (93% by weight) or 271 grams of acrolein on a 100% by weight basis. The unconverted acrolein was recovered in the isopentane coolant stream.

The recovered polymer was a finely divided dry-to-the-touch powder which could be easily pulverized and poured. The polymer was thus quite different from the polymer obtained in a related experiment wherein the acrolein was polymerized in a water system using a redox catalyst. In that case, the product was a soft, wet, non-pulverizable mass containing about 80% by weight of water.

The polymer prepared above was dissolved in aqueous sulfur dioxide to form a water-soluble polyacrolein-sulfur dioxide adduct. 0.5%, 1% and 2% water solutions of this adduct were prepared and sheets of rag and kraft paper passed into and through the solution. The treated paper sheets were then pressed out on dry paper and allowed to dry at room temperature. The resulting product had the appearance, feel and flexibility of the untreated paper, but demonstrated improvement in fold endurance, abrasion resistance, dimensional stability and improved wet and dry strength. The retention of strength when wet is shown in the following table:

| Paper | Control, percent | Solutions Employed | | |
|---|---|---|---|---|
| | | 0.5% | 1% | 2% |
| | | Percent | Percent | Percent |
| Rag | 0 | 21 | 30 | 30 |
| Kraft | 0 | 11 | 23 | 24 |

*Example II*

The operation of this experiment was similar to that in Example I. 417 grams of the powdered polyacrolein from the experiment shown in Example I were charged to the reactor. Over a 2.75 hour reaction period, 280 ml. of 93% acrolein containing 0.35% by weight tertiary butyl hydroperoxide were fed into the reactor. During the same time, 28 ml. of 1.93% by weight of sulfur dioxide in water were fed to the reactor. At the end of the operation, a 100-gram sample of polyacrolein powder was removed from the reactor. The polymer contained 29% by weight of water and had an intrinsic viscosity of 1.46 dl./g. The recovered polymer was finely dry-to-the-touch powder which could be easily pulverized and poured.

The polymer prepared above was dissolved in aqueous sulfur dioxide and the solution used to treat rag and kraft paper as shown in Example I. The resulting product had the appearance, feel and flexibility of the untreated paper, but demonstrated improvement in fold endurance, abrasion resistance, dimensional stability and improved wet and dry strength. The retention of strength when wet is shown in the following table:

| Paper | Control, percent | Solutions Employed | | |
|---|---|---|---|---|
| | | 0.5% | 1% | 2% |
| | | Percent | Percent | Percent |
| Rag | 0 | 22 | 25 | 25 |
| Kraft | 0 | 21 | 24 | 22 |

*Example III*

The operation of this experiment was similar to that in Example I. The polyacrolein remaining in the reactor at the end of the experiment shown in Example II was used as starting material. Over a 4-hour period, 370 ml. of 93% by weight of acrolein containing 0.35% by weight of tertiary butyl hydroperoxide were fed to the reactor. During this time, 31 ml. of 1.93% by weight of sulful dioxide in water were fed.

The total amount of polyacrolein recovered from the experiment in Example II and Example III was 765 grams, with a water content of 31% by weight, giving a polyacrolein content, dry basis, of 528 grams. The amount of disacryl charged at the start of the experiment in Example II was 263 grams, dry basis, so that the net make of polyacrolein, dry basis, was 265 grams. The total acrolein fed during Examples II and III was 650 cc. (543 grams) of a 93% by weight of acrolein, or a total of 505 grams of acrolein, 100% by weight basis. The remainder of the acrolein was mainly in the isopentane coolant used during the runs, and could be utilized for further polymerization during sustained operation.

The polyacrolein removed from the reactor at the end of the above run had an intrinsic viscosity of 1.20 dl./g. The recovered polymer was a finely divided, dry-to-the-touch powder which could be easily pulverized and poured.

The polymer prepared above was dissolved in aqueous sulfur dioxide to form a water-soluble polyacrolein-sulfur dioxide adduct. 0.5%, 1% and 2% aqueous solutions of the adduct were prepared and used for treating paper as shown in Example I. The resulting products had improved fold endurance, abrasion resistance, dimensional stability and improved wet and dry strength. The retention of strength when wet is shown in the following table:

| Paper | Control, percent | Solutions Employed | | |
|---|---|---|---|---|
| | | 0.5% | 1% | 2% |
| | | Percent | Percent | Percent |
| Rag | 0 | 23 | 22 | 26 |
| Kraft | 0 | 25 | 27 | 22 |

*Example IV*

In a further experiment, 475 grams of the powdered polymer prepared in Example III was charged to the reactor, and the reactor was operated intermittently for a total period of 18 hours and 50 minutes. At the end of this time, the reactor contained 1123 grams of polyacrolein of a water content of about 30% by weight. The net make of polyacrolein, dry basis, was 448 grams. During this time, 1218 grams of acrolein, 100% by weight dry basis, were fed. The unreacted acrolein was mainly in the isopentane coolant, which was removed from the system at the end of each operating period (a total of five periods), with fresh isopentane being charged at the start of each run.

The polyacrolein recovered from this experiment had an intrinsic viscosity of 0.74 dl./g. The recovered polymer was finely divided dry-to-touch powder which could be easily pulverized and poured.

*Example V*

Example I is repeated with the exception that the reducing agent employed was aqueous solution of sodium bisulfite in place of the sulfur dioxide. Related results are obtained.

*Example VI*

Example I is repeated with the exception that the peroxide employed was benzoyl peroxide instead of ditertiary butyl hydroperoxide. Related results are obtained.

*Example VII*

Example I is repeated with the exception that the preformed polymer is a homopolymer of acrolein having an intrinsic viscosity of 0.9 dl./g. and a mesh size between 10 and 60. Related results are obtained.

*Example VIII*

This example illustrates a batch operation of the process of the invention.

To a glass reactor was added the following components: 56% by weight of the preformed polymer of acrolein as in Example I, 12% by weight acrolein, tertiary butyl hydroperoxide and a stoichiometric amount based on the peroxide of either aqueous sulfur dioxide or sodium metabisulfite. The mixture was stirred at a rate of about 250 r.p.m. and the temperature was maintained as shown in the table. The conversion of the acrolein to polymer is shown in the table below:

| Temperature, °C | 40 | 30 | 20 | 20 | 20 | 30 |
|---|---|---|---|---|---|---|
| TBHP, percent w | 0.15 | 0.15 | 0.15 | 0.65 | 0.20 | 0.20 |
| Reductant | $SO_2$ | $SO_2$ | $SO_2$ | $SO_2$ | $Na_2S_2O_5$ | $Na_2S_2O_5$ |
| AN Conversion, Percent: | | | | | | |
| 20 minutes | 64 | 25 | 19 | 39 | 45 | 67 |
| 40 minutes | 77 | 40 | 28 | 52 | 64 | 77 |
| 60 minutes | 81 | 52 | 34 | 56 | 68 | 82 |
| 80 minutes | 82 | 61 | 38 | 60 | | 85 |
| 120 minutes | | 72 | 44 | | | 88 |

The above clearly demonstrates the rapid rates of reaction obtained by the present process. The polymer obtained in each case was a high molecular weight polymer which was recovered as a white finely divided dry-to-touch powder. The polymers are dissolved in aqueous sulfur dioxide and used for the treatment of paper as shown in Example I. The rag and kraft paper treated with the solution show improved wet and dry strength.

*Example IX*

This example illustrates the use of an inert gas to keep the powdered preformed polymer in agitated condition.

The apparatus used in this experiment is substantially the same as that shown in FIGURE II. The reactor was filled with 216 parts of powdered dry polyacrolein having an intrinsic viscosity of 1.5 dl./g. and a mesh size between 20 and 65. The polymer particles are fluidized by passing nitrogen gas in at the bottom of the reactor, the nitrogen being recovered at the top, cooled and recycled. Tertiary butyl hydroperoxide as an 0.5 M aqueous solution was mixed with acrolein and the mixture sprayed in at the top of the reactor at the rate of about 1 ml./minute. The reducing agent which is a polyacrolein-sulfur dioxide adduct (2.93% aqueous solution) is introduced at the top of the reactor at the rate of about 0.5 ml./min. The temperature of the reactor was maintained at about 25° C. The reaction was stopped at the end of about 2 hours. The polymer recovered weighed 268 parts, indicating a gain of 52 parts polymer. The polymer was recovered as a finely divided dry-to-touch powder. The polymer had an intrinsic viscosity of 0.9 dl./g. and dissolved in sulfur dioxide.

An 0.5% and 2% solution of the polymer-sulfur dioxide adduct in water was prepared and used to treat sheets of rag and kraft paper as in Example I. The resulting product had the appearance, feel and flexibility of the untreated paper, but demonstrated improvement in fold endurance, abrasion resistance, dimensional stability and improved wet and dry strength.

*Example X*

Example IX is repeated with the exception that the reducing agent employed is an aqueous solution of sulfur dioxide. Related results are obtained.

*Example XI*

Example IX is repeated with the exception that the reducing agent employed is sodium thiosulfate. Related results are obtained.

*Example XII*

The apparatus used in this example was as in the above Example IX with the exception that the method of injecting the feed was as shown in FIGURE III, i.e., the feed was impinged on a rotating plate and the nitrogen gas passed the plate so that the material would be carried up into the reactor. Acrolein and peroxide mixture was introduced at a rate of 1.0 ml./min. The reducing agent was introduced at a rate of 0.5 ml./min. The temperature was 25° C. At the end of about one hour and 55 minutes the reaction was stopped. The charge was 226 parts of polyacrolein and the final product was 354, indicating the formation of 128 parts of polymer. The product obtained was a high molecular weight polyacrolein which was obtained as a finely divided dry-to-the-touch powder.

*Example XIII*

Example IX is repeated with the exception that 10% by weight of the acrolein is replaced with acrylonitrile. The resulting product is a high-molecular-weight finely divided powdered copolymer of acrolein and acrylonitrile.

*Example XIV*

Example IX is repeated with the exception that 25% by weight of the acrolein is replaced with ethyl acrylate. A high molecular weight copolymer of acrolein and ethyl acrylate which is a finely divided dry-to-touch powder is obtained.

*Example XV*

Example IX is repeated with the exception that 10% by weight of the acrolein is replaced with butadiene. A high molecular weight copolymer of acrolein and butadiene which is a finely divided dry-to-touch solid is obtained.

*Example XVI*

Example I is repeated with the exception that the redox catalyst is omitted and the reaction mixture is exposed to X-rays at a temperature of 25° C. The dose rate is 1.2×10 rads per hour with a total dosage of about 2.4×10 rads. A high molecular weight polymer dry to the touch is obtained.

*Example XVII*

Example XVI is repeated with the exception that the medium is exposed to spent uranium reactor fuel elements. Related results are obtained.

We claim as our invention:

1. A process for preparing high molecular weight polymers of alpha,beta-ethylenically unsaturated aldehydes which comprises effecting polymerization of the aldehyde in a vapor phase medium containing finely divided powdered particles of a polymer of an alpha,beta-ethylenically unsaturated aldehyde, which particles are suspended in said medium and agitated so that they do not settle to the bottom.

2. A process for preparing high molecular weight polymers of an alpha,beta-ethylenically unsaturated monoaldehyde recoverable as a finely divided dry-to-touch powder which comprises effecting polymerization of the monoaldehyde by means of a peroxide catalyst and reducing agent in a vapor phase medium containing finely divided powdered particles of a polymer of an unsaturated monoaldehyde while maintaining the reaction medium in a high degree of agitation so as to keep the polymer particles substantially suspended in said medium in the reaction zone.

3. A process as in claim 2 wherein the unsaturated aldehyde is acrolein.

4. A process as in claim 2 wherein the unsaturated aldehyde is methacrolein.

5. A process as in claim 2 wherein the peroxide catalyst is tertiary butyl hydroperoxide.

6. A process as in claim 2 wherein the reducing agent is a polyacrolein-sulfur dioxide adduct.

7. A process as in claim 2 wherein the polymerization is conducted at a temperature between −10° C. and 40° C.

8. A process as in claim 2 wherein the polymer of the aldehyde is maintained in a fluidized condition by passing an inert gas through the reaction zone.

9. A process as in claim 2 wherein the polymer is maintained in a highly agitated condition by rapid stirring.

10. A process as in claim 2 wherein the unsaturated aldehyde in the reaction zone varies from about 1% to 15% by weight of the powdered polymer.

11. A process for preparing a high molecular weight polymer of acrolein which comprises injecting monomeric acrolein, a peroxide catalyst and a reducing agent into a reactor containing agitated powdered polyacrolein suspended in a vapor phase, at a temperature between 0° C. and 45° C.

12. A process as in claim 11 wherein the amount of acrolein makes up from 1% to 15% by weight of the polyacrolein.

13. A process as in claim 11 wherein the reducing agent is a polyacrolein-sulfur dioxide adduct.

14. A process as in claim 11 wherein liquid having a boiling point below the temperature of reaction is introduced into the reaction zone as a coolant.

15. A process for preparing a high molecular weight polymer of acrolein which comprises effecting polymerizatoin of the acrolein by means of high energy ionizing radiation in a vapor phase medium containing finely divided powdered particles of a polymer of acrolein while maintaining the reaction mixture containing the powdered polymer in a high degree of agitation so as to keep the polymer particles suspended in said vapor phase medium and prevent them from settling to the bottom.

16. A process for preparing high molecular weight copolymers of an alpha,beta-ethylenically unsaturated aldehyde and a dissimilar ethylenically unsaturated monomer, which copolymer is recoverable as a finely divided dry-to-touch powder, which comprises effecting polymerization of the mixture of aldehyde and dissimilar monomer by means of a redox polymerization catalyst in a vapor phase medium containing finely divided solid particles of a polymer of the aldehyde and maintaining the reaction mixture in a high degree of agitation so that the polymer particles remain suspended in said vapor phase medium and do not settle to the bottom.

17. A process as in claim 16 wherein the unsaturated aldehyde is acrolein.

18. A process as in claim 16 wherein the dissimilar monomer is acrylonitrile.

19. A process as in claim 16 wherein the dissimilar monomer is an alkyl acrylate.

20. A process as in claim 16 wherein the dissimilar monomer is styrene.

References Cited by the Examiner

UNITED STATES PATENTS

| | | | |
|---|---|---|---|
| 1,158,542 | 1/58 | French | 204—154 |
| 2,958,637 | 11/60 | Voorhees | 204—193 |
| 2,996,481 | 8/61 | Eifert et al. | 260—67 |
| 3,068,203 | 12/62 | Schweitzer | 260—67 |
| 3,081,244 | 3/63 | Campanile | 204—154 |

OTHER REFERENCES

Hart: Bridesburgh Library Translation No. MBL–96 (Pamphlet No. 20,186–T), Chapter III, 6. "Degradation" relied on. From Industrie Chemique Belges, 21, 1309–17 (1956) TP1.I44.

WILLIAM H. SHORT, *Primary Examiner.*

JOSEPH L. SCHOFER, *Examiner.*